United States Patent [15] 3,682,437
Miller [45] Aug. 8, 1972

[54] SEALING VALVE FOR PRESSURE REGULATOR

[72] Inventor: Henry A. Miller, Scotch Plains, N.J.

[73] Assignee: Air Reduction Company Incorporated, New York, N.Y.

[22] Filed: March 30, 1971

[21] Appl. No.: 129,411

[52] U.S. Cl. ............ 251/61.2, 251/333, 137/505.41, 137/505.42
[51] Int. Cl. .......................................... F16k 31/145
[58] Field of Search ... 137/505.41, 505.42; 251/61.2, 251/61.3, 333, DIG. 1

[56] References Cited

UNITED STATES PATENTS

| 2,745,628 | 5/1956 | Carlson | 251/333 X |
| 2,920,653 | 1/1960 | Wolff | 251/333 X |
| 3,191,626 | 6/1965 | Leibfritz | 251/DIG. 1 |

Primary Examiner—Harold W. Wealsley
Attorney—Larry R. Cassett, Edmund W. Bopp and Hume H. Mathews

[57] ABSTRACT

A novel seat arrangement for a gas pressure regulator having an O-ring seat positioned in a retainer cap on the high pressure side of the regulating orifice wherein the regulated gas pressure is transmitted through the valve stem to the space in the retainer cap behind the O-ring seat.

7 Claims, 5 Drawing Figures

PATENTED AUG 8 1972  3,682,437
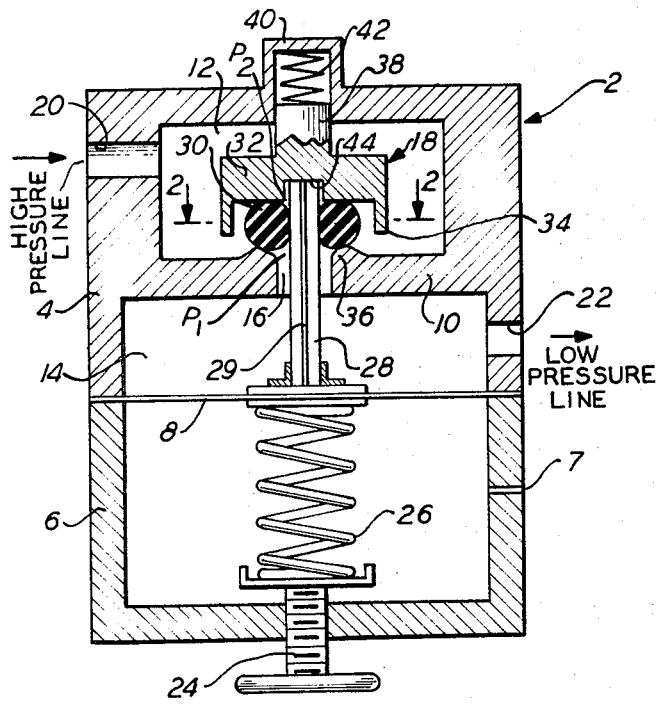
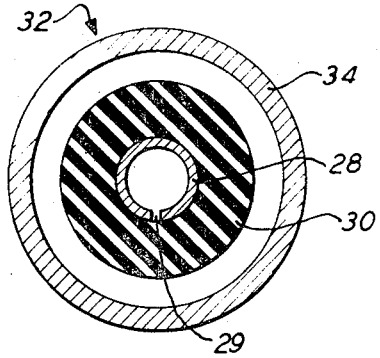
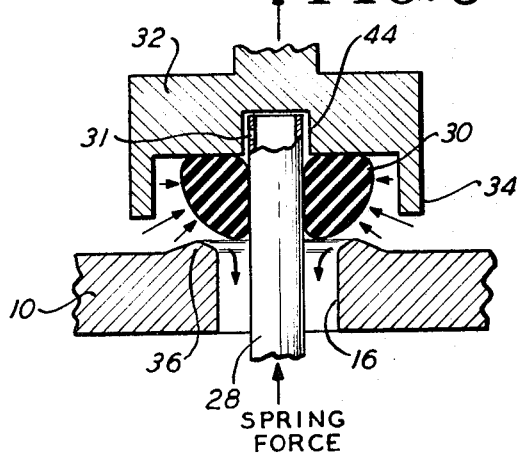
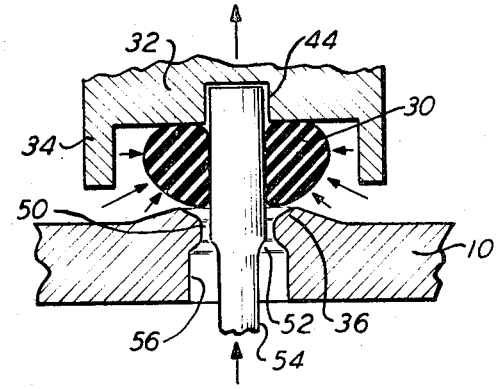
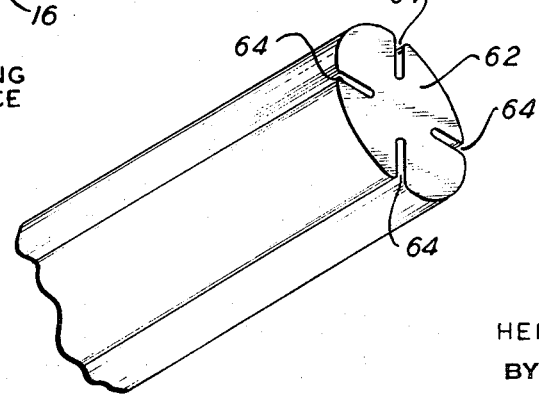
INVENTOR
HENRY A. MILLER
BY *Larry B. Cassett*
ATTORNEY

SEALING VALVE FOR PRESSURE REGULATOR

BACKGROUND OF THE INVENTION

In the normal operation of pressure regulators commonly used in applications of industrial gases it is desirable that the regulator valve for controlling the connection between the high pressure and low pressure lines operate in positive, efficient manner and be capable of many thousands of operating cycles without excessive wear and malfunction.

Heretofore, the sealing valve for controlling the regulator orifice between the high pressure and low pressure chambers has been made in various forms, none of which have been entirely satisfactory from the standpoint of consistent and efficient functioning, low down-time and cost of maintenance. For example, a well-known and simple form of seal is the well-known O-ring or torus. As generally used, the O-ring is made of a tough resilient composition such as teflon or high quality rubber, and is seated by a retainer disc or cap against a hard seat. Thus, the ring and cap under high differential pressure make a tight seal for closing the valve orifice. The O-ring as previously used, however, has not given consistently good performance due to difficulties encountered in the opening operation. In this part of the valve cycle, the high pressure differential across the O-ring tends to hold the O-ring firmly on the hard seat as the cap is urged away by its operating stem. A possible result is that the ring may be dislodged from the cap and forced into the passageway between the high and low pressure chambers causing a malfunction; also, in overcoming strong sealing forces, e.g. 1,000 psig, during opening, the ring where fastened to its cap, may be subjected to high gradient stretching and tearing forces tending toward deterioration and decreased sealing efficiency.

Another known form of valve seal for pressure regulators constitutes a prefabricated valve assembly, wherein a resilient member with a peripheral sealing portion is bonded or calendered to a brass retainer cap. Here, malfunction due to seal dislodgement is avoided but the problem due to seal deterioration still remains. As this form of prefabricated valve is comparatively expensive, frequent replacement thereof with consequent shutdown of the regulator constitutes a significant commercial disadvantage.

The present invention is concerned with a simple and improved O-ring valve seal for pressure regulators that overcomes the difficulties described above.

SUMMARY OF THE INVENTION

In accordance with the invention an O-ring having suitable sealing characteristics for differential pressure control is freely positioned within a valve retainer cap and is initially seated under spring pressure against a hard seat closing the regulator orifice. The differential pressure across the valve cap and O-ring assembly serves to hold the valve cap and O-ring on the hard seat for closing and tight sealing thereof. For opening the valve and passing gas during regulation, the valve cap and O-ring are lifted from the hard seat by a valve stem that is longitudinally vented for connecting the inner peripheral side of the O-ring with the low pressure region, thereby causing the pressure differential across the O-ring to compress it tightly around the stem. The stem in turn, is actuated according to movement of a member responsive to the pressure in the low pressure region.

Accordingly during initial opening movement of the valve, the O-ring tends to move with the stem thereby causing sufficient distortion in the O-ring shape to break the pressure seal with the hard seat with consequent instant application of the high pressure to the O-ring for opening the regulating orifice.

A principal object of the invention therefore is an improved pressure regulator sealing valve of the O-ring type, that is positive, efficient and reliable in operation, and that is durable and inexpensive.

A specific and related object is an improved and simplified O-ring sealing valve arrangement wherein the valve stem serves to keep the inner sealed periphery of the O-ring at lower pressure than in the high pressure chamber.

Other objects, features and advantages will appear from the following description with reference to the accompanying drawing.

BRIEF DESCRIPTION OF DRAWING

FIG. 1 is a sectional view in elevation of an elemental form of pressure regulator with an O-ring valve seal embodying the present invention;

FIG. 2 is a cross-sectional view taken along the line 2—2 of FIG. 1;

FIG. 3 is a partly sectional view in elevation of an O-ring valve seal similar to those shown in FIGS. 1 and illustrating the initial opening stage;

FIG. 4 is also a partly sectional view generally similar to FIG. 3, showing a modified form of valve stem and regulator orifice structure, and FIG. 5 illustrates modified stem for low pressure distribution.

DESCRIPTION OF PREFERRED EMBODIMENT

FIG. 1 shows by way of example a typical pressure regulator 2 of conventional type to which the present invention is applied. The regulator in the elementary form illustrated comprises a cylindrical split casing consisting of an upper section 4 and a lower section 6, between which is clamped at its periphery a pressure responsive diaphragm 8. The upper section 4 has a partition 10 for defining an upper high pressure chamber 12 and a low pressure chamber 14, the bottom wall of which is the diaphragm 8. The casing below the diaphragm is vented to atmosphere at 7.

A flow control opening 16 in the partition 10 is controlled by a valve assembly 18 which embodies the invention for admitting gas from the chamber 12 and high pressure line 20, to the chamber 14 and subsequently to the low pressure outlet feed line 22. The valve assembly 18 operates to maintain the gas in the chamber 14 at a substantially constant pressure that is set in a well known manner by the adjustment knob 24 in combination with the diaphragm spring 26. The pressure in the chamber 12 tends to cause closing of the valve 18 when the pressure in the chamber 14 is at its rated value; opening of the valve takes place when the chamber 14 pressure decreases, such that the diaphragm spring forces the valve stem 28 upward, thereby opening the valve and passing high pressure gas to restore the desired pressure in the low pressure chamber.

Pressure regulators as generally described above are well known in the art and application thereto of the valve assembly of the invention will be apparent. Specifically, the valve assembly 18 consists essentially of a resilient sealing O-ring 30 that is composed, for example, of a durable high grade rubber preferably with low sulphur content, a retaining cap 32 for the O-ring, and a depending longitudinally vented operating stem 28. The cap and stem function jointly for retaining, centering and seating the O-ring on the hard seat 36, the valve stem 28 being operatively connected to the cap 32 as presently described. The O-ring fits snugly on the stem within the cap, the stem being hollow and laterally vented, in the example shown, to both the O-ring inner periphery and the low-pressure chamber. The valve cap has a vertical extension 38 that is guided for limited reciprocal movement in a cylindrical recess 40 in the upper wall of the chamber 12, and is biased downwardly by a re-seating spring 42. The spring 42 is materially weaker than the diaphragm spring 26 and acts in combination with the high pressure differential to reseat the valve when the diaphragm is depressed upon restoration of normal pressure in the low pressure chamber 14. The valve stem 28 at its upper end makes abutting engagement with the cap 32 within a guide recess 44, and the lower end makes suitable contact with the diaphragm. As shown the stem diameter is less than that of opening 16 for providing an annular passage with sufficient cross section for adequate flow of the high pressure gas to the low pressure chamber.

In the valve-closed position shown wherein the O-ring is seated at 36, the pressure in chamber 12 and the force of the reseating spring serve to force the cap 32 and O-ring downwardly against the seat 36 so that the resilient O-ring together with the cap, make a pressure seal between the high pressure and low pressure chambers. The high pressure also forces the O-ring tightly against the stem, as the pressure at points $P_1$ and $P_2$ is the same as in the low pressure chamber. Specifically, the seal is completed by the contact between the lower side of the ring and the seat 36 and the upper side of the ring and valve cap 32. Thus, there can be no gas flow through the opening 16 when the O-ring is seated as described above.

For a better understanding of the pressure-utilizing function of the valve and its operation in response to a drop in pressure within the chamber 14, reference is also made to FIGS. 2 and 3. In FIG. 3 there is illustrated, in somewhat exaggerated manner, the position of the valve components at the instant of opening. As the opening operation is extremely rapid, the exact configuration of the O-ring cannot be accurately determined; however, the nature of the forces acting thereon can be ascertained from consideration of pressures tending to squeeze the O-ring against the retaining cap and the valve stem.

As indicated in FIGS. 1 and 2, the valve stem 28 may be in the form of a hollow rolled tube open along its seam 29, the upper end venting into the cap recess 44 and the lower end into the low pressure chamber. Alternately the stem may be a seamless tube with ends that may be serrated or have a hole therethrough as indicated at 31 in FIG. 3, so that pressure in the interior of the tube is able to reach area $P_2$. A similar hold would also be required at the low pressure chamber end of the valve stem. In all of these embodiments the valve stem communicates the pressure in the low pressure chamber to the inner peripheral area $P_2$ of the O-ring; i.e., $P_2$ is at lower pressure than the outer periphery as described above, for holding the ring tightly on the stem.

In FIG. 1, the O-ring in its sealing position is forced by the high pressure, both directly by pressure on the outer ring periphery and indirectly through the valve cap 32, into tight engagement with both the hard seat and cap 32. Assuming now that downstream use of the low pressure gas reduces the pressure in chamber 14 so that the diaphragm spring predominates and initially pushes the diaphragm and valve stem upwardly, as indicated in FIG. 3, it will be apparent that the very high friction produced by the tight compression of the O-ring on the stem tends to cause movement of the O-ring with the stem as a unit; however, there is initially the strong sealing force tending to keep the lower portion of the O-ring on the seat 36. It is believed that a momentary distortion in the O-ring configuration, such as that indicated in FIG. 3, takes place tending possibly to roll or slide the lower edge of the mechanically separate O-ring away from the seat such that a slight break in the seal is achieved. Immediately upon occurrence of the break, high pressure gas from chamber 12 is released to flow into the low pressure chamber. As the valve cap 32 and O-ring continue to move upwards, the pressure difference on the O-ring and its friction contact with the stem continue to hold it in place within the valve cap. Accordingly, there is no necessity for molding or otherwise securing the O-ring to the cap, since it is continuously biased toward and held at a fixed position on the stem, i.e. substantially at the junction of the stem and cap.

As mentioned above, the O-ring of the present invention can advantageously be made of superior quality rubber having a low sulphur content; however, where rubber is bonded to brass, for example, high sulphur content is required and therefore the advantage of low sulphur rubber is not available for the prefabricated type of bonded seal. The physical characteristics of the O-ring are not critical; however, the O-ring body should be sufficiently resilient to accommodate imperfections in the hard seat or the presence of small foreign particles, and yet be rigid enough to prevent extrusion into the inner low pressure region of the regulator.

In certain instances depending on pressure differentials and other factors, it may be desirable to partially restrict the nozzle opening during the initial stem opening movement. This feature is shown by FIG. 4 wherein the O-ring functions to break the seal at seat 36 generally as described above, except that a high flow rate of the high pressure gas through the nozzle is momentarily delayed until the stem has moved upward a determined distance. The annular nozzle opening 50 at the seat 36 is materially restricted (as compared with the opening 16) until the stem shoulder 52 clears the seat 36, thereby raising the reduced diameter portion 54 out of the nozzle. At this point, the upper or input end of the passage 56 is expanded for high flow to the low pressure chamber. The arrangement shown in FIG. 4 can be used to advantage, for example in precluding distortion and extrusion of the O-ring into the passage 56 where unusually high pressure ratios are involved. That is, the passage is sufficiently restricted at the moment the pressure seal is broken by the O-ring that the liklihood of ring extrusion is reduced to a minimum. When the operating stem has moved to a point where the passage is enlarged for full flow, the O-ring is at such distance above the valve seat that the pressure in the upper chamber still serves to hold the O-ring in its normal position on the stem and within the cap 32.

The valve stem 28, although preferably in the form of a hollow tube for pressure distribution as described above, can take several alternative forms. For example in FIG. 5 stem 62 consists of a solid rod that is longitudinally fluted or grooved as shown at 64. The grooves form low pressure passages that function as described above for keeping the inner part of the O-ring at low pressure. The fluting is sufficiently deep and restricted in width as indicated, for preventing extrusion therein of adjacent portions of the O-ring, such that the flutes would be blocked for pressure distribution to the upper inner edge of the O-ring. Thus, the valve stem of FIG. 5 functions generally in the manner as the stems shown in FIGS. 1 to 3 for keeping the inner side of the O-ring at the low pressure level.

The valve could also be constructed of a gas-permeable rod made, for example, of a suitable sintered material. Here the permeable characteristic of the sintered mixture is sufficient in itself to ensure low pressure distribution at the inner periphery of the O-ring for maintaining the pressure differential described above. It will be apparent of course, that the entire length of such a stem need not be of sintered material as low pressure distribution can be achieved according to the invention by a sintered tip between the cap 32 and passage 16.

The present invention therefore not only lends itself to a very simple, easily assembled and inexpensive construction for a pressure regulator valve and seal, but in addition provides for positive and fast valve opening without excessive deterioration of the seal, malfunction and downtime of the regulator.

As used herein and in the following claims, the term "O-ring" is not intended as strictly limited to a sealing ring having a circular, i.e. exactly "O" shape, transverse cross-section as indicated by way of preferred example in FIG. 1. It will be apparent that it is within the scope of the invention to use if desired, a sealing ring having a suitable non-circular section, such as for example an oval, deformed circle, etc., and the claims are to be so construed.

Having set forth the invention in what is considered to be the best embodiment thereof, it will be understood that changes may be made in the system and apparatus as above set forth without departing from the spirit of the invention or exceeding the scope thereof as defined in the following claims.

I claim:

1. A pressure regulator having high and low pressure chambers connected by a valve having soft and hard seats and operable in response to the pressure in the low pressure chamber wherein said valve comprises a retaining cap, a valve stem with one end thereof positioned within said retaining cap, said soft seat comprised of an O-ring of resilient material around the said one end of said stem and positioned within the cap for making sealing contact with the hard valve seat in the valve closed position, the stem including fluid passage means connecting the low pressure area of said regulator and the inner-peripheral surface of said O-ring adjacent the retainer cap whereby the pressure in the high pressure chamber holds the O-ring against the stem and retainer cap during the initial opening movement of the valve for breaking the pressure seal.

2. A pressure regulator as specified in claim 1 wherein the valve stem is of tubular form and is laterally vented at said one end.

3. A pressure regulator as specified in claim 2 wherein the valve stem has a longitudinal seam whereby the pressure on the outside and inside of the stem are the same.

4. A pressure regulator valve as specified in claim 1 wherein the operating stem is composed of a gas permeable material at the portion between said cap and low pressure region.

5. A pressure regulator valve as specified in claim 4 wherein the gas permeable material is a sintered mixture.

6. A pressure regulator as specified in claim 1 wherein said valve stem includes longitudinal grooves along at least a portion of the said one end thereof.

7. A pressure regulator as specified in claim 1 wherein said valve stem has an enlarged diameter over a portion of said one end thereof.

* * * * *